(12) United States Patent
Utz et al.

(10) Patent No.: US 7,611,123 B2
(45) Date of Patent: Nov. 3, 2009

(54) THROTTLE DEVICE

(75) Inventors: Udo Utz, Ditzingen (DE); Ralf Kromer, Altbach (DE); Michael Knorpp, Weissach (DE)

(73) Assignee: Robert Bosch GmbH, Stuttgart (DE)

( * ) Notice: Subject to any disclaimer, the term of this patent is extended or adjusted under 35 U.S.C. 154(b) by 695 days.

(21) Appl. No.: 11/212,589

(22) Filed: Aug. 29, 2005

(65) Prior Publication Data

US 2006/0048748 A1 Mar. 9, 2006

(30) Foreign Application Priority Data

Sep. 7, 2004 (DE) .................. 10 2004 043 125

(51) Int. Cl.
*F16K 1/22* (2006.01)
(52) U.S. Cl. ...................... 251/308; 251/305
(58) Field of Classification Search .............. 251/308, 251/305
See application file for complete search history.

(56) References Cited

U.S. PATENT DOCUMENTS

| | | | | |
|---|---|---|---|---|
| 5,092,296 A | * | 3/1992 | Gunter et al. | ............... 251/305 |
| 5,098,064 A | * | 3/1992 | Daly et al. | .................. 251/306 |
| 5,564,909 A | * | 10/1996 | Rischen et al. | .............. 417/273 |

OTHER PUBLICATIONS

Callister, William D. Jr., Materials Science and Engineering: An Introduction, 1997, John Wiley & Sons, Inc., Fourth Edition, 788-789.*

* cited by examiner

*Primary Examiner*—John Rivell
*Assistant Examiner*—Andrew J Rost
(74) *Attorney, Agent, or Firm*—Ronald E. Greigg

(57) ABSTRACT

A throttle device for controlling an internal combustion engine, in which the throttle valve is supported precisely employs a bearing recess serving to support the throttle valve shaft which is surrounded by a clamping element. As a result, there is excellent, durable stabilization of the bearing recess. The throttle device is especially well suited to vehicles that have a throttle-type internal combustion engine.

14 Claims, 2 Drawing Sheets

THROTTLE DEVICE

CROSS-REFERENCE TO RELATED APPLICATIONS

This application is based on German Patent Application 10 2004 043 125.6 filed Sep. 7, 2004, upon which priority is claimed.

BACKGROUND OF THE INVENTION

1. Field of the Invention

The invention is directed to an improved throttle device for an internal combustion engine.

2. Description of the Prior Art

Throttle devices for internal combustion engines typically have a throttle valve shaft, which is pivotably supported in a throttle valve housing and onto which a throttle valve is integrally formed or secured. A gas duct extends through the throttle valve housing. Through the gas duct, air or a fuel-air mixture, for instance, can flow to an engine. The throttle valve opens and closes the gas duct by pivoting of the throttle valve shaft.

To keep the throttle valve from hitting the wall of the gas duct, it is known to set close tolerances for the mobility of the throttle valve shaft in its axial direction.

In the throttle device shown in German Patent Disclosure DE 39 24 611 A1, the throttle valve shaft is fixed in the axial direction, that is, the longitudinal direction of the throttle valve shaft, by a pin extending transversely through the throttle valve shaft.

In the throttle device shown in German Patent Disclosure DE 30 48 995 A1, the axial force transmission between the throttle valve shaft and the throttle valve housing is effected via a ball bearing built into the throttle valve housing.

In German Patent Disclosure DE 195 10 622 A1, a bearing means is press-fitted into the throttle valve housing, and a spring tenses the throttle valve shaft against this bearing means for the sake of exact axial positioning of the throttle valve shaft.

Depending on the material used, and particularly depending on the material used for the throttle valve housing, it can happen in the prior art that the axial support of the throttle valve shaft shifts, so that the unimpeded mobility of the throttle valve in the throttle valve housing at every temperature is no longer assured.

OBJECT AND SUMMARY OF THE INVENTION

The throttle device of the invention, for an internal combustion engine has the advantage over the prior art that the throttle valve housing is so stable in the region of the bearing recess that forces that occur between the throttle valve shaft and the throttle valve housing can be securely intercepted in both the radial and the axial direction. This is true even whenever, for the sake of simple manufacture and/or inexpensive material and/or other demands, such as resistance to chemical attacks from outside, a material for the throttle valve housing is chosen that is relatively soft and/or relatively yielding and/or a that yields over the course of time because of forces acting on it.

Because of the clamping element, the throttle valve housing, even in the region of the bearing recess, can for instance be a plastic.

The clamping element can also serve very well as a guard against friction or impact, in order to protect the throttle valve housing against damage from mechanical abrasion, indentations, or blows. The clamping element can protect the throttle valve housing against damage from a spring, for instance, that might come to vibrate.

When the throttle valve housing for the bearing recess is formed onto or built onto an extension as well, the advantage is attained with a clamping element that even in this design of the throttle valve housing, secure support of the throttle valve is assured.

The clamping element can preferably be embodied in the form of a sleeve, which has the advantage that the clamping element can be produced at little effort or expense.

If the throttle valve housing is entirely, or at least in the region of the bearing recess, of plastic, this then has the advantage that the throttle valve housing can be produced rather simply and nevertheless, with the aid of the clamping element, a secure support of the throttle valve shaft is obtained.

The clamping element may for instance comprise metal, which has the advantage that even with a small clamping element, made for instance from a thin metal sheet, a good stabilizing action is attained.

Because of the clamping element, good stability is attained in the region of the bearing recess, which has the advantage that a bearing can be built into the bearing recess without problems; the bearing may for instance be a slide bearing or a roller bearing, in particular a roller bearing or a ball bearing.

Because of the stabilizing action of the clamping element, a bearing can be built or press-fitted into the bearing recess with rather great radial prestressing.

If a material is selected for the clamping element that has a coefficient of thermal expansion which is approximately equivalent to that of the bearing built into the bearing recess, then this has the advantage that at both a very high and a very low temperature, the pressure between the bearing and the bearing recess remains essentially unchanged. This is even true if the throttle valve housing or the extension, in the region of the bearing recess, is of a material having a different coefficient of thermal expansion. For the throttle valve housing and for the extension, plastic can then easily also be used.

BRIEF DESCRIPTION OF THE DRAWINGS

The invention will be better understood and further objects and advantages thereof will become more apparent from the ensuing detailed description of a preferred embodiment taken in conjunction with the drawings, in which.

DESCRIPTION OF THE PREFERRED EMBODIMENT

Figure 1:
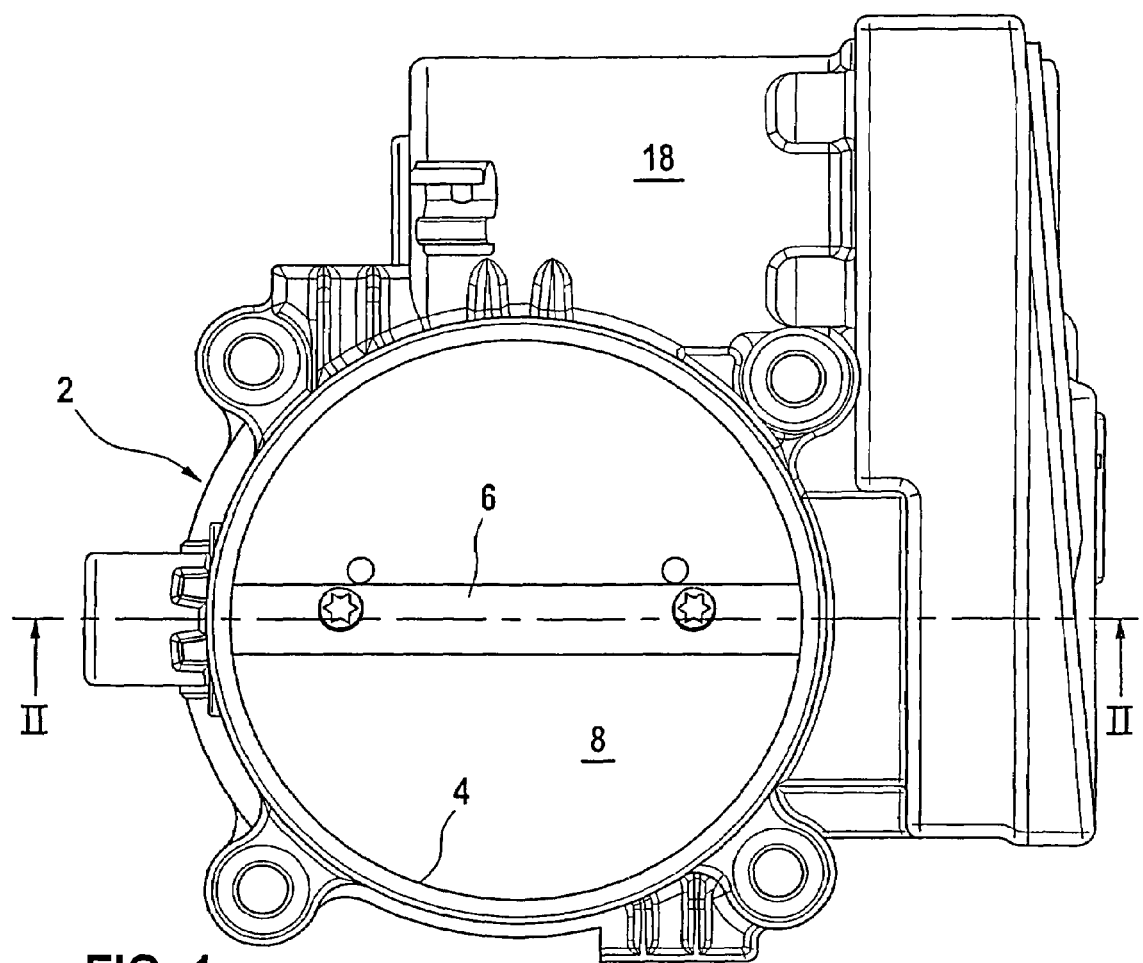
FIG. 1 shows a plan view on the selected exemplary embodiment of the throttle device.

The throttle device according to the invention can be employed in various internal combustion engines in which a passage through a gas duct is to be controlled with the aid of a throttle valve. The gas duct is intended for instance for a flow of air, a fuel-air mixture, and so forth. Depending on the pivoted position of the throttle valve, the flow of gas is more or less throttled. Normally, the throttle valve can be pivoted to an angle of up to 90°. However, versions also exist in which the throttle valve can be pivoted by less than 90° or more than 90°, for instance up to 180°. The throttle valve shaft with the throttle valve can be pivoted with the aid of an adjusting device that engages the throttle valve shaft. The adjusting device is for instance a control motor, which engages the throttle valve shaft and adjusts the throttle valve shaft, for instance directly or via a gear.

In all the drawing figures, parts that are the same or function the same are identified by the same reference numerals.

Figure 2:
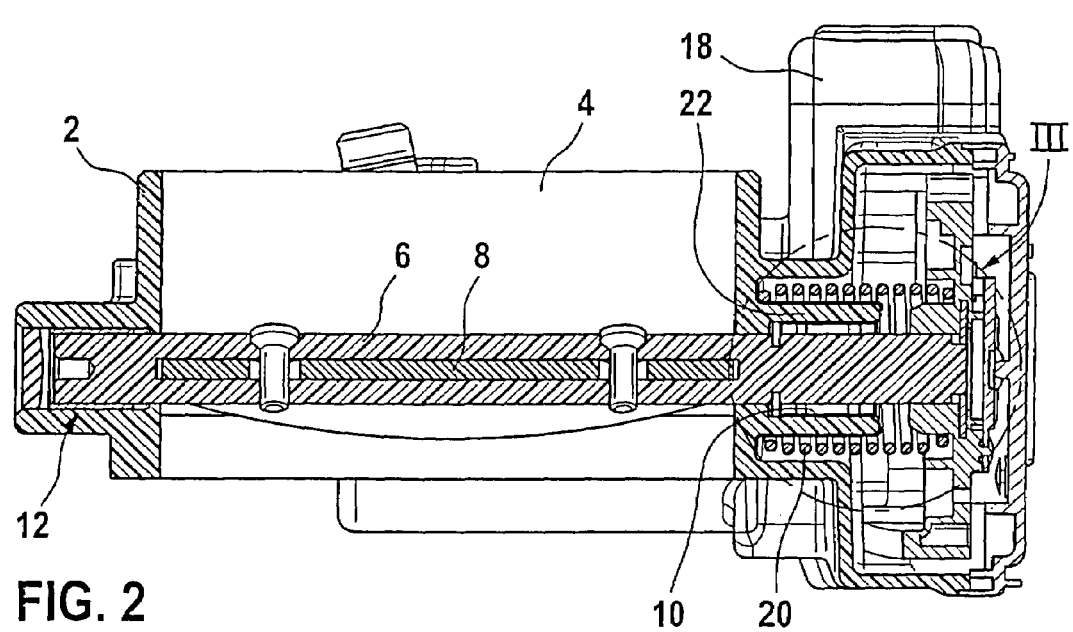
FIG. 2 shows a section through the throttle device along the plane marked II-II in FIG. 1.
Figure 3:
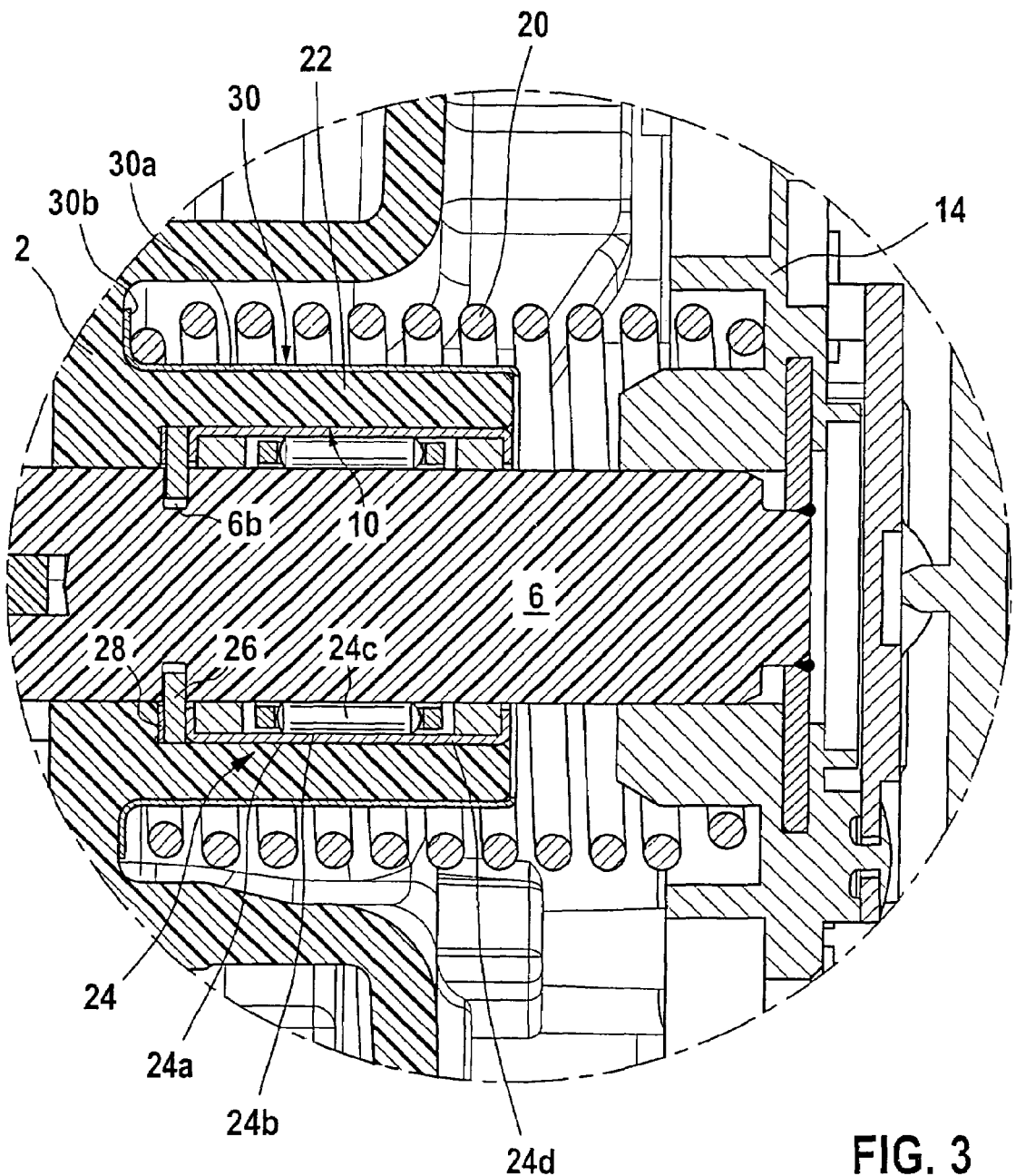
FIG. 3 shows an enlarged detail of a circular area marked III in FIG. 2.

FIGS. 1 through 3 show the throttle device with a throttle valve housing 2. A gas duct 4 shown end-on in FIG. 1 extends through the throttle valve housing 2. The gas duct 4 is for instance part of an intake tube leading to combustion chambers of an internal combustion engine. Extending transversely through the gas duct 4 is a throttle valve shaft 6, which is pivotably supported in the throttle valve housing 2. A throttle valve 8 is secured to the throttle valve shaft 6. The throttle valve 8 may for instance also be manufactured in one piece from plastic together with the throttle valve shaft 6.

A bearing recess 10 and a further bearing recess 12 are provided on the throttle valve housing 2. The throttle valve shaft 6 is pivotably supported in the bearing recesses 10, 12.

An articulation means 14 is solidly joined to the throttle valve shaft 6. In the exemplary embodiment shown, the articulation means 14 is embodied in the form of a gear wheel injection-molded or welded onto the throttle valve shaft 6. Since the throttle valve 8 is not supposed to be pivoted by more than 1100, for instance, it suffices if the injection-molded-on gear wheel has outer teeth in a region of only 110°, which teeth mesh with a drive pinion or a control motor via a further gear wheel. The control motor together with the gear wheel and the articulation means 14 form an adjusting device 18 for adjusting the throttle valve 8 supported on the throttle valve shaft 6.

One end of an adjusting spring 20 is pivotably connected on one end directly or indirectly to the throttle valve housing 2, and on the other end the adjusting spring 20 is pivotably connected directly or indirectly to the throttle valve shaft 6 or the throttle valve 8. In the exemplary embodiment shown, the right-hand end of the adjusting spring 20 acts on the throttle valve shaft 6 via the articulation means 14. The left-hand end of the adjusting spring 20 is supported on the throttle valve housing 2. The adjusting spring 20 serves the purpose of restoring the throttle valve shaft 6 or the throttle valve 8 to an unactuated position of repose.

An extension 22 protrudes laterally onto the throttle valve housing 2. The extension 22 is preferably formed integrally together with the throttle valve housing 2. The extension 22 is preferably of the same material as the throttle valve housing 2. The extension 22 is preferably, like the rest of the throttle valve housing 2, made of a plastic. Thus the throttle valve housing 2 can be produced together with the extension 2 very simply, for instance by injection molding.

The bearing recess 10 is formed for instance by a stepped bore extending from the outside into the extension 22 of the throttle valve housing 2. A bearing 24 with oversize is press-fitted into the bearing recess 10. The diameter of the outer cylindrical surface 24a of the bearing 24 is greater than the diameter of the bearing recess 10 in the region of the bearing 24. As a result, the bearing 24 presses in the radial direction against the throttle valve housing 2, but the bearing 24 is not displaced, by the forces that occur during the operation of the throttle device.

The bearing 24 is for instance a roller bearing 24b. In the preferred selected exemplary embodiment, the roller bearing 24b has an outer ring 24d and a plurality of rollers 24c or bearing needles, which are received in the outer ring 24d.

The outer circumference 24a of the outer ring 24d is dimensioned such that the outer ring 24d is retained with prestressing in the bearing recess 10.

A plunge cut 6b extending all the way around is provided on the throttle valve shaft 6. A disk 26 is installed in the plunge cut 6b. A wave washer 28 that is resilient in the axial direction tenses the disk 26 against the outer ring 24d of the bearing 24. In the process, the wave washer 28 is braced on the throttle valve housing 2; more precisely, it is braced on its face end on the stepped bore that forms the bearing recess 10. It is thus assured that during the operation of the throttle device, no relative motion in the longitudinal direction of the throttle valve shaft 6 occurs between the disk 26 and the bearing 24, or between the disk 26 and the throttle valve housing 2.

The plunge cut 6b in the throttle valve shaft 6 is minimally wider than the thickness of the disk 26, so that when the disk 26 is stopped the throttle valve shaft 6 can easily be rotated.

A clamping element 30 surrounds the bearing recess 10. In the preferred selected exemplary embodiment, the clamping element 30 is provided on the outer circumference of the extension 22 of the throttle valve housing 2. The clamping element 30 surrounds the extension 22 completely in the region of the bearing recess 10. In the preferred selected exemplary embodiment, the outer ring 24d of the bearing 24 presses from the inside outward against the extension 22, and the clamping element 30 presses from the outside inward against the extension 22. Since the clamping element 30 presses radially against the extension 22 from the outside inward, the extension 22 cannot expand, despite the radial force of the press-fitted bearing 24 that acts on the extension 22. This is true even if the extension 22 or the entire throttle valve housing 2 is of a plastic that would yield, without the proposed fastening by the clamping element 30, or if the plastic would creep over the course of time, if there were not the stabilizing clamping element 30.

The clamping element 30 is preferably cylindrical or sleevelike and has approximately the shape of a stepped, hat-shaped cylinder, open at the face end, with a cylindrical region 30a and a radial region 30b.

The clamping element 30 is preferably closed, viewed in the circumferential direction. However, the clamping element 30 may also be slit along a center line, for instance.

The clamping element 30 is preferably of metal, for instance, preferably a hardened metal, and in particular spring steel.

The adjusting spring 20 can be braced by one end at the transition between the cylindrical region 30a and the radial region 30b. This prevents the end of the adjusting spring 20 from being able to dig into the relatively soft material comprising the throttle valve housing 2.

The cylindrical region 30a of the clamping element 30 is located between the extension 22 of the throttle valve housing 2 and the adjusting spring 20. It is thus assured that even under severe vibrational stress of the throttle device, the windings of the adjusting spring 20 cannot directly strike the extension 22 of the throttle valve housing 2. As a result, it can be assured, even if a relatively soft material is used for the extension 22, that the adjusting spring 20 can damage neither the extension 22 nor any other region of the throttle valve housing 2.

The material of the clamping element 30 is preferably selected such that it has largely the same coefficient of thermal expansion as the bearing 24, or at least the outer ring 24d of the bearing 24. This can be achieved very simply by providing that the bearing 24, or at least the outer ring 24d of the bearing 24, is of metal and the clamping element 30 is likewise of metal, so that both the clamping element 30 and the bearing 24, or the outer ring 24d, have practically the same coefficient of thermal expansion. Because the bearing 24 and the clamping element 30 have the same coefficient of thermal expansion, it is assured that at both a very high incident operating temperature and a very low temperature, the press fit of the material comprising the extension 22 or the throttle valve housing 2 remains practically unchanged between the bearing 24 and the clamping element 30.

The foregoing relates to a preferred exemplary embodiment of the invention, it being understood that other variants and embodiments thereof are possible within the spirit and scope of the invention, the latter being defined by the appended claims.

We claim:

1. In a throttle device for an internal combustion engine, having a throttle valve housing (2) which includes an extension (22) which has a bearing recess (10), and having a throttle valve shaft (6) with a throttle valve (8), in which the throttle valve shaft (6) is pivotably supported in the bearing recess (10) and is pivotable with the aid of an adjusting device (18) that engages the throttle valve shaft, the improvement comprising a clamping element (30) surrounding the extension (22) in the region of the bearing recess (10), and wherein
   (a) the throttle valve shaft (6) is supported in the bearing recess (10) via a bearing (24);
   (b) the bearing (24) having an outer circumference (24*a*) such that it fits within the bearing recess (10) with a radial tension against the inside of the bearing recess (10); and
   (c) the damning element (30) having an internal diameter such that it presses from the outside inwardly against the extension (22).

2. The throttle device as recited in claim 1, wherein the extension (22) is integrally formed onto the throttle valve housing (2).

3. The throttle device as recited in claim 2, wherein the clamping element (30) is a sleeve.

4. The throttle device as recited in claim 2, wherein the throttle valve housing (2), at least in the region of the bearing recess (10), is of plastic.

5. The throttle device as recited in claim 1, wherein the clamping element (30) is a sleeve.

6. The throttle device as recited in claim 5, wherein the throttle valve housing (2), at least in the region of the bearing recess (10), is of plastic.

7. The throttle device as recited in claim 6, wherein the clamping element (30) is of metal.

8. The throttle device as recited in claim 5, wherein the clamping element (30) is of metal.

9. The throttle device as recited in claim 1, wherein the throttle valve housing (2), at least in the region of the bearing recess (10), is of plastic.

10. The throttle device as recited in claim 1, wherein the clamping element (30) is of metal.

11. The throttle device as recited in claim 1, wherein the bearing (24) is a roller bearing.

12. The throttle device as recited in claim 1, wherein the bearing (24) is a roller bearing.

13. The throttle device as recited in claim 1, wherein the bearing (24) is a slide bearing.

14. The throttle device as recited in claim 1, wherein the clamping element (30) has a coefficient of thermal expansion which is substantially of the same magnitude as a coefficient of thermal expansion of the bearing (24).

* * * * *